Feb. 3, 1959    W. R. SHAFFER    2,872,210
STABILIZED TRAILER
Filed Feb. 6, 1957    3 Sheets-Sheet 1
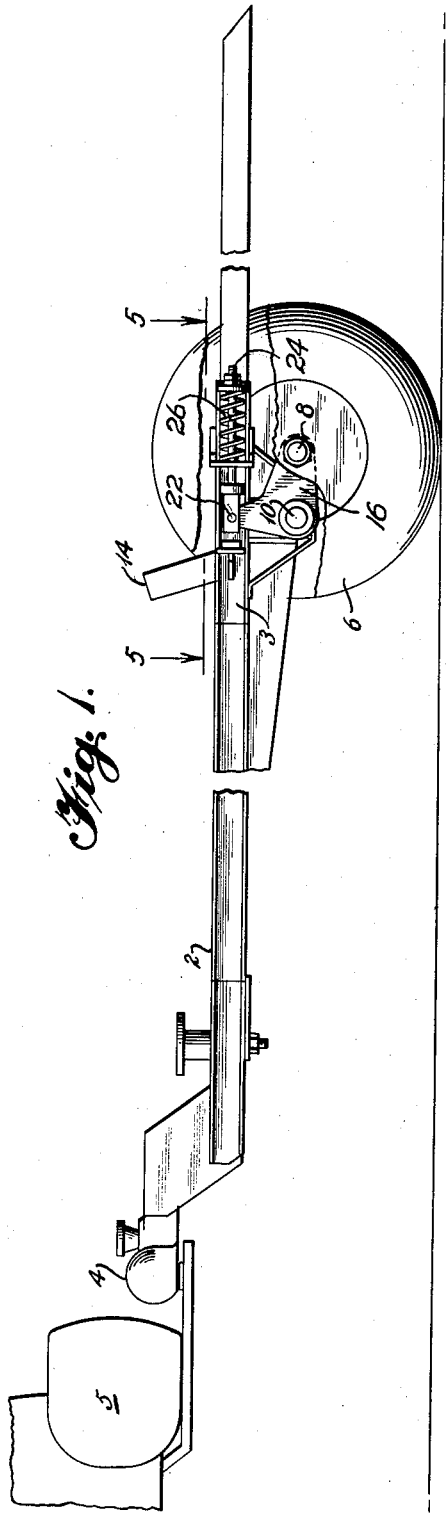
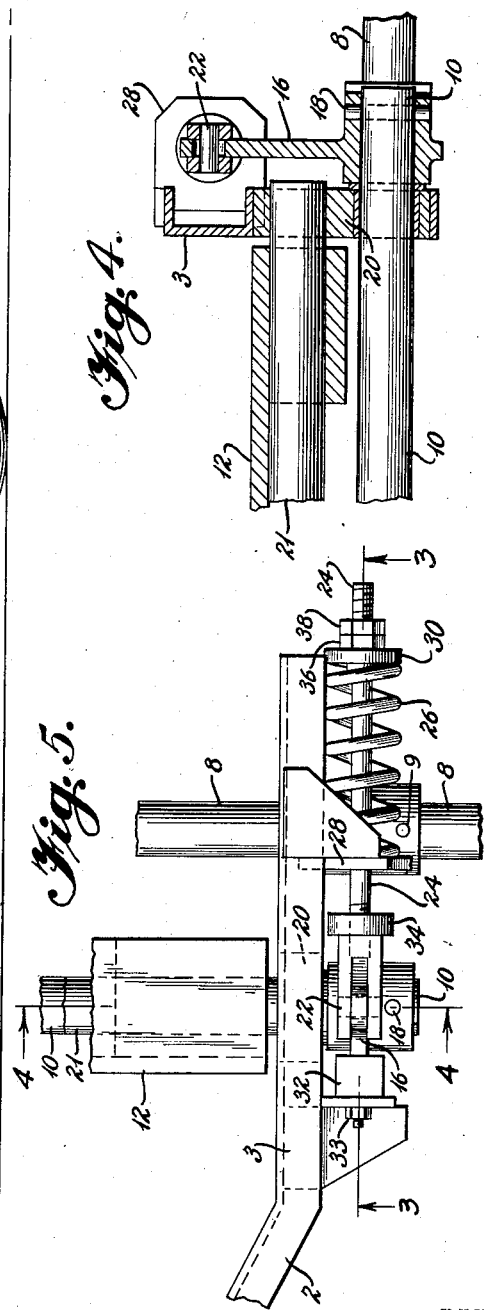
INVENTOR
*William R. Shaffer,*
BY *Karl W. Flocks*
ATTORNEY

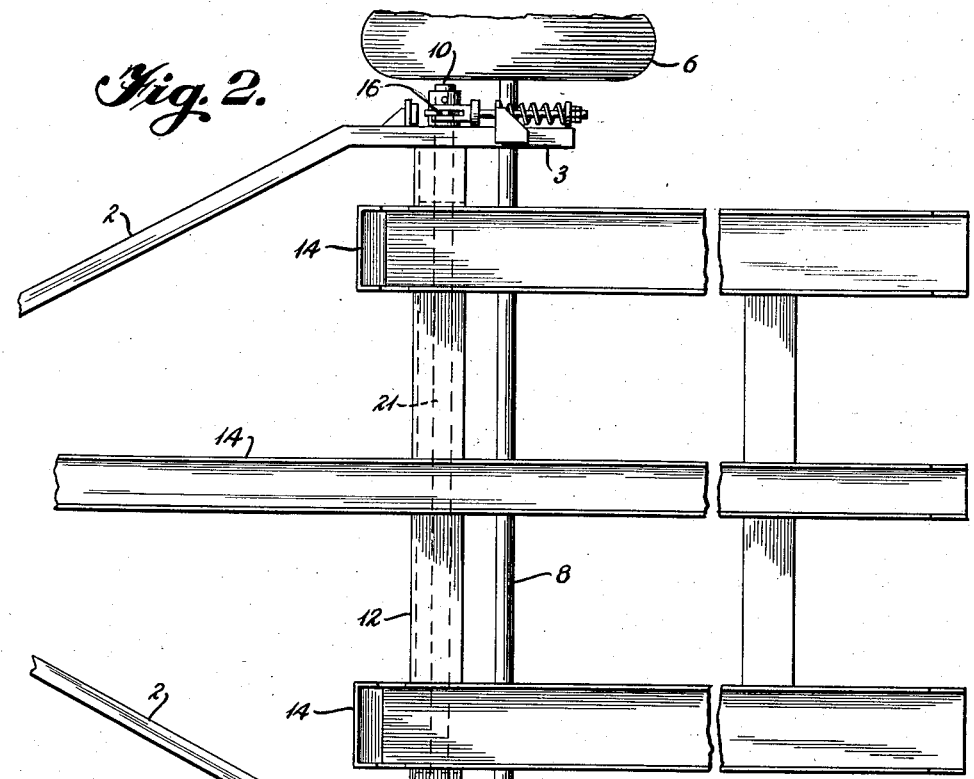
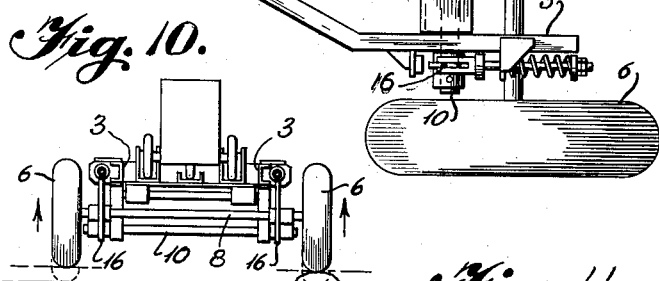
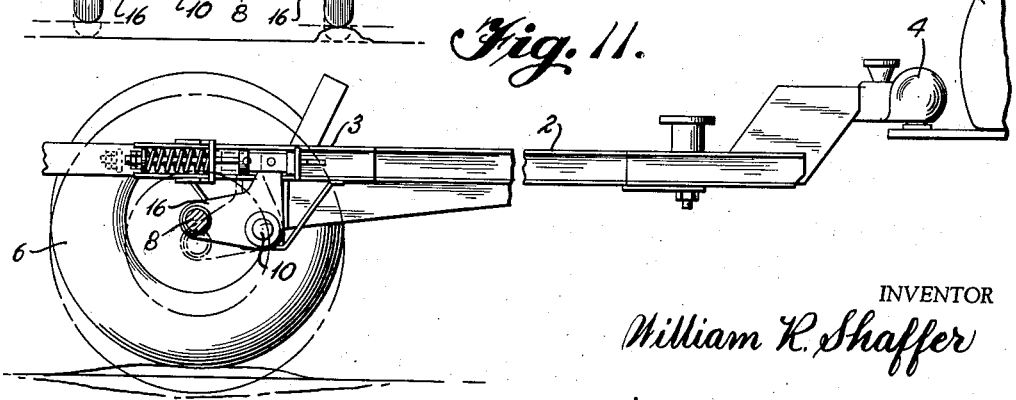

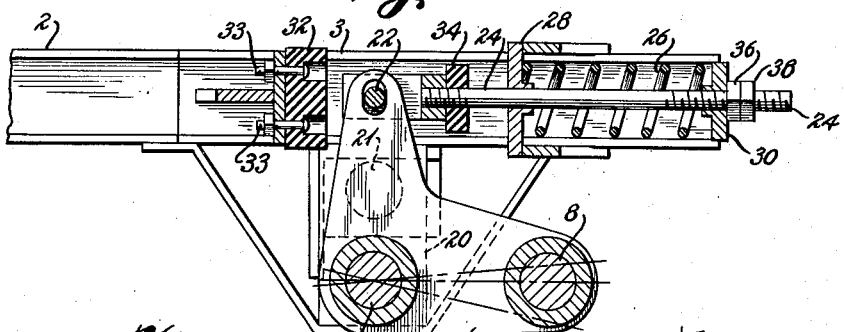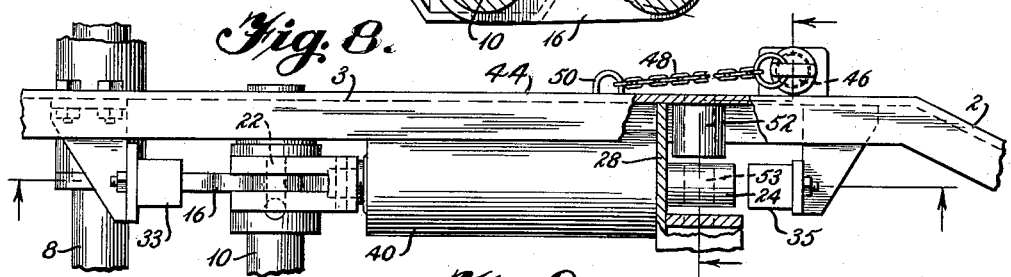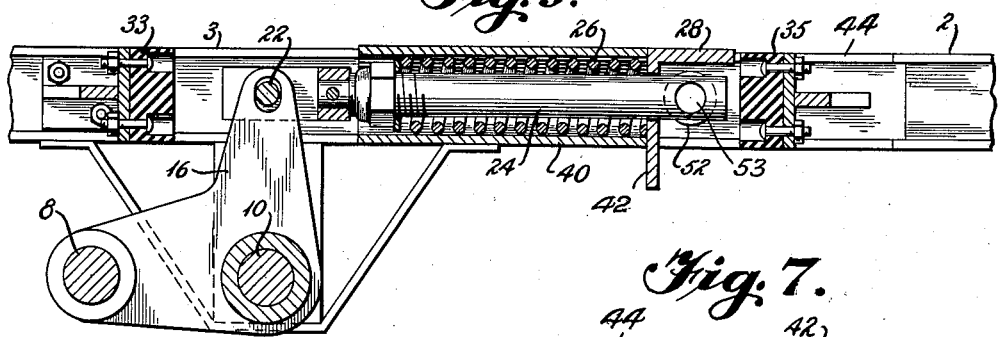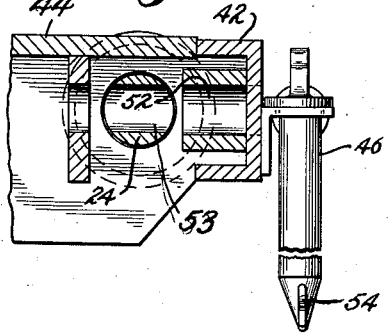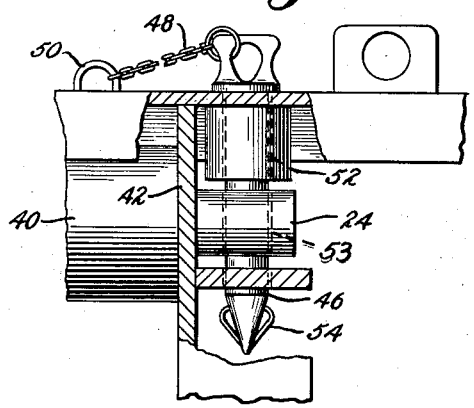

United States Patent Office 2,872,210
Patented Feb. 3, 1959

2,872,210

STABILIZED TRAILER

William R. Shaffer, Huntingdon, Pa., assignor to Wald Industries, Inc., Huntingdon, Pa., a corporation of Pennsylvania Application February 6, 1957, Serial No. 638,510

2 Claims. (Cl. 280—124)

This invention relates generally to improvements in wheel suspensions and particularly to improved wheel suspensions for two-wheeled trailers. In accordance with this invention the load carried by the trailer frame is transferred to the wheels by means of spring-restrained rocker arms in such a manner that instability and rocking effects are minimized.

A primary object of this invention is to provide resilient suspension means for the wheels of a trailer which is simple, practical in construction, readily adjustable according to the load on the trailer, and which will effectively absorb the shocks incident to travel of the trailer over irregular road surfaces.

Another object is to provide a trailer wheel suspension wherein the wheels are mounted for up and down movements as they encounter irregularities in the road surface and arranged with springs which yieldably resist upward movements of the wheels and which transmit road shocks to the vehicle in a substantially horizontal and longitudinal plane with very little upward movement. Thus, comparatively great up and down movements of the wheels and wheel axle may occur with very little corresponding movement of the vehicle itself so that it rides evenly and smoothly over even the roughest road surfaces.

Another object of this invention is to provide a wheel suspension means for trailers which will cause road shocks to be transmitted equally to both springs of the trailer, thus insuring that the two wheels will move up and down at the same time so as to thereby maintain the trailer load in as level and as stable a position as possible.

This invention further aims to provide a wheel suspension means for the purpose referred to which is strong, durable, compact, simple in its construction and arrangement, thoroughly efficient in its use, readily assembled and installed, quickly repaired when the occasion requires, and comparatively inexpensive to manufacture.

Other objects and the nature and advantages of the instant invention will be apparent from the following description taken in conjunction with the accompanying drawings, wherein:

Figs. 1 and 2 are fragmentary and broken away side and plan views, respectively, of a two-wheel trailer embodying the novel suspension means of this invention;

Fig. 3 is a fragmentary side view taken along 3—3 of Fig. 5;

Fig. 4 is a fragmentary end view taken along 4—4 of Fig. 5;

Fig. 5 is a fragmentary plan view taken along 5—5 of Fig. 1;

Figs. 6 and 7 are fragmentary side and end views, respectively, of a locking means for the wheel suspension means of this invention;

Figs. 8 and 9 are fragmentary plan and side views, respectively, of a second embodiment of a wheel suspension means in accordance with this invention;

Figs. 10 and 11 are fragmentary broken away end and side views, respectively, showing how the wheel suspension means of this invention serves to stabilize a trailer when riding over a bump in the road.

Referring now to Figs. 1 and 2, there is illustrated a two-wheel trailer embodying the novel suspension means of this invention. As shown, this trailer consists of diverging frame members 2, parallel frame members 3, towing vehicle engaging assembly 4, towing vehicle bumper 5, trailer wheels 6, wheel axle 8, torsion shaft 10, track support 12, and tracks 14. The tracks 14 permit a wheeled vehicle to be rolled up upon the frame and transported by the trailer.

After seeing the general location of the instant wheel suspension means on a trailer in Figs. 1 and 2, one may obtain a better and more detailed understanding of the exact construction of this wheel suspension means by referring to Figs. 3, 4 and 5, which are enlarged views of the wheel suspension means shown in Figs. 1 and 2.

Referring now to Figs. 3, 4 and 5, it will be seen that the rocker arm 16 is fastened by means of pin 18 to a torsion shaft 10. Torsion shaft 10 extends through bearing block 20 (which is welded to the frame) and is adapted to freely rotate in bearings located in the bearing block. Bearing blocks on opposite sides of the trailer frame are preferably (but not necessarily) rigidly interconnected by means of a solid cylindrical rod 21.

Torsion shaft 10 extends between and connects the rocker arms on each side of the trailer so that any rotation of the torsion shaft will cause both rocker arms to move in the same direction. Stated in other words, any movement of one rocker arm will result in approximately the same movement in the other rocker arm due to the face that the two rocker arms are interconnected by torsion shaft 10. The rocker arm is preferably approximately L-shaped and it is preferred that the legs of the rocker arm be disposed at about a 90° angle to each other. One leg of the rocker arm, and preferably the normaly horizontal leg, is adapted to contain the wheel axle 8 and may be anchored thereto by welding or by means of pin 9. The outboard ends of the axle carry the wheels, the details of which are not shown because they are so well known. The substantially vertical leg of the rocker arm is connected by a pin 22 and clevis to a spring rod 24 which, in turn, supports and engages a compression spring 26. One end of the compression spring bears on bracket 28 attached to the trailer frame while the other end of the compression spring is held by an adjustable plate 30. Over-travel of the vertical leg of the rocker arm is prevented by rubber snubbers 32 and 34, snubbers 32 being fastened to brackets on the trailer frame by means of bolts 33. As a general rule, the vertical leg of the rocker arm can be designed to move through an arc of less than 90°. In operation, both rocker arms will have substantially the same simultaneous angular movement because of the restraint imposed by the interconnecting torsion shaft 10. (There might be a slight difference resulting from the angular deflection of the torsion shaft, although under normal operating loads this should be very small.) Any displacement of one wheel, therefore, will be transferred instantaneously to the opposite side of the trailer via the torsion shaft. This will result in a uniform movement of the wheel axle relative to the body with a corresponding lateral leveling and stabilizing action. Furthermore, any spring deflection resulting from a wheel deflection will also be transferred to the opposite side of the trailer, causing a corresponding deflection. This means that all static and dynamic loads anywhere on the machine are carried equally by both springs. This will reduce maximum spring forces compared to those on a conventional vehicle.

Referring again to Figs. 1–5, it will be observed that when the wheel suddenly hits a sharp bump in the road, the rocker arm 16 will be pivoted in a counterclockwise direction. When rocker arm 16 is caused to move in a counterclockwise direction, the vertical leg of the rocker arm will be moved toward the left, and spring rod 24 will in turn, be pulled to the left to thereby compress compression spring 26 against bracket 28. Thus, most of the force of the bump is transmitted through rocker arm 16 to the compression spring 26 as a horizontal force, rather than being transmitted to the frame as a vertical force. Even more important, however, since the rocker arms 16 are rigidly interconnected by torsion shaft 10, when one wheel encounters a sharp bump in the road, the force of that bump is transmitted to both wheels. Since the two rocker arms move in unison, this means that the compression springs 26 also move in unison to absorb the shock and to convert vertical into horizontal force.

This joint action of the rocker arms and compression springs has several worthwhile advantages. First of all, since both compression springs will aid in absorbing the shock forces applied to one wheel, each compression spring can be smaller than would ordinarily be required to absorb the shock of one wheel. Secondly, in the event that one compression spring should suddenly and unexpectedly fail while the trailer is in motion, the coaction of the rocker arms would mean that the wheel with the defective compression spring would still be protected against excessive shocks by the operation of the compression spring on the other wheel.

It will be further observed that due to the close coaction of the rocker arms, when one wheel goes over a sharp bump and the wheel is raised, the other wheel will also have a tendency to rise off the ground the same distance, thus tending to insure that the frame of the trailer will be maintained in a substantially level and stable position. This practically eliminates the possibility that a sharp and sudden bump in the road could so tilt the trailer that the trailer load would be caused to topple over.

Figs. 10 and 11 show by means of solid and dotted lines how the wheel suspension means of this invention operates on a two-wheel trailer when the trailer encounters irregularities in a road. In Fig. 11, the dotted wheel lines indicate the position of the wheels when the trailer is riding on a smooth road surface, while the solid wheel lines indicate the position of both wheels when a bump in the road is encountered. This drawing clearly illustrates the coaction between the rocker arms and torsion shaft which causes the wheels to move in unison. This coaction insures stability and minimizes the danger of the trailer load toppling over. Fig. 11 illustrates by means of dotted and solid lines how the rocker arm 16 pivots about torsion shaft 10 as the wheel 6 rides over bumps and depressions.

When the wheel suspension means of this invention is to be used on a trailer on which the load is expected to remain approximately constant, the adjustable nuts 36 and 38 on the end of a spring rod 24 are adjusted so as to maintain the vertical leg of the rocker arm substantially vertical when in its equilibrium position. When very light or very heavy loads are carried by the trailer, it may be necessary to even use a different set of springs in order to maintain this desired position.

Under certain circumstances, it may be necessary or desirable to "lock-out" the spring action of the wheel suspension means shown in Figs. 1–5. For example, when the wheel suspension means is used on a road center-line striper, it is desirable that the wheel suspension means fulfill two functions. First of all, when the road center-line striper is being towed to the roadway to be striped, at a fairly fast rate of speed, it is desirable that the wheel suspension means function to absorb road shocks caused by bumps and depressions. Secondly, when the road center-line striper arrives at its destination, it is necessary that the striper be maintained at a fixed height above the highway if a line of uniform width is to be produced. Consequently, in certain instances it may be desirable to "lock-out" the spring action and Figs. 6, 7, 8 and 9 show one means whereby this might be accomplished.

In Figs. 6, 7, 8 and 9, a cylindrical iron pipe 40 is welded at one end to a bracket 42 attached to the frame 44. Pipe 40 surrounds the previously described compression springs 26 and spring rod 24 and serves as a dirt cover and can be omitted if desired. One extremity of spring rod 24 contains a hole 53 through which a locking pin 46 is adapted to pass. The upper end of locking pin 46 can be attached by means of a light chain 48 to a ring 50 welded to the frame 44. In addition to passing through the hole in the spring rod 24, the locking pin 46 passes through an aligned hole and guide 52 located on the frame. To insure that locking pin 46 will not be accidentally jarred out of the hole in the end of the spring rod, it may be desirable to incorporate a depressible spring catch 54 in the lower portion of the locking pin. When the locking pin 46 is engaged with the hole in the end of the spring rod 24, the compression springs and rocker arms are effectively locked in one position so that there will be no up and down vibratory movement of the frame relative to the axle.

A somewhat different wheel suspension arrangement in accordance with the teachings of this invention is shown in Figs. 8 and 9. In these figures, the front of the trailer is toward the right and the compression spring 26 (surrounded by iron pipe 40) is disposed further away from the horizontal leg of the rocker arm than was the case with the embodiment shown in Figs. 1–5. In this particular application, it is preferred that the rocker arm and spring assembly be mounted within the trailer frame instead of outside the frame. Wheel shaft 8, torsion shaft 10, pin 22, spring rod 24 and compression spring cooperate in much the same manner as the embodiment shown in the previous figures, but it is to be noted that the compression spring 26 is actuated in a slightly different manner in that the end of the compression spring furthest from the rocker arm is essentially stationary, while the other end of the compression spring moves to the right or left in response to the movement of the vertical leg of the rocker arm. Bumpers 33 and 35 are disposed a little differently than the resilient bumpers 32 and 34 of Figs. 1–5. Bracket 28 is disposed at the opposite end of the compression spring than was the case with Figs. 1–5. When the hole 52 in the frame is aligned with the hole 53 in the spring rod, it is obvious that the action of the compression spring may be "locked out" with a pin 46 as was discussed with respect to the embodiment shown in Figs. 6 and 7.

If desired, the compression spring may be protected from dust, dirt, weather, etc., by means of any suitable cover which will surround the spring without, however, restricting its movement.

It will be obvious to those skilled in the art that various changes may be made without departing from the spirit of the invention and therefore the invention is not limited to what is shown in the drawings and described in the specification but only as indicated in the appended claims.

What is claimed is:

1. A two-wheel trailer comprising a frame, said frame comprising two oppositely disposed, parallel frame members, two wheels mounted upon a single transverse axle and wheel suspension means, said wheel suspension means comprising a pair of bearing brackets attached to said frame members, a torsion shaft passing through and rotatably mounted within said bearing brackets, aligned rocker arms fastened to opposite extremities of said torsion shaft, one leg of each rocker arm being connected to the wheel axle and the other leg of each rocker arm being operatively connected to one end of a substantially horizontal spring rod, a spring abutment bracket secured to one of said frame members, said bracket having a hole therein and said spring rod traversing said hole, a spring abutment plate adjustably secured to the other end of said spring rod, a spring extending between said spring abutment plate and said spring abutment bracket, a first rubber snubber on said spring rod and adapted to engage the opposite side of said abutment bracket from said spring, and a second rubber snubber secured to said frame member and disposed in facing relationship to said spring abutment bracket, said other leg of said rocker arm extending between said second rubber snubber and said spring abutment bracket.

2. A two-wheel trailer comprising a frame, two wheels and wheel suspension means, said wheel suspension means comprising a pair of bearing brackets, means fixedly attaching each of said bearing brackets to an opposite side of the trailer frame, a torsion shaft passing through and rotatably mounted within said bearing brackets, aligned rocker arms fastened intermediate their ends to opposite extremities of said torsion shaft, a single axle carried by one leg of each rocker arm and in turn supporting said wheels at opposite sides of said trailer, a pair of compression springs each having one end attached to the frame, means operatively attaching the other end of each of said springs to the other leg of each rocker arm, and yieldable stop means operatively associated with said frame and the other leg of each rocker arm for limiting movement of said rocker arms in both directions.

References Cited in the file of this patent
UNITED STATES PATENTS

| | | |
|---|---|---|
| 1,073,330 | Bushby | Sept. 16, 1913 |
| 1,757,839 | Keck | May 6, 1930 |
| 1,767,987 | Johnston | June 24, 1930 |
| 2,011,239 | Christman | Aug. 13, 1935 |
| 2,126,085 | Balz | Aug. 9, 1938 |
| 2,631,842 | Oppenlander | Mar. 17, 1953 |
| 2,762,631 | Entz | Sept. 11, 1956 |